(12) United States Patent
Kuromusha et al.

(10) Patent No.: US 7,013,913 B2
(45) Date of Patent: Mar. 21, 2006

(54) FLOW CONTROL VALVE

(75) Inventors: Junya Kuromusha, Kyoto (JP); Shigeru Yamashita, Ohtsu (JP)

(73) Assignee: Shimadzu Corporation, Kyoto (JP)

( * ) Notice: Subject to any disclaimer, the term of this patent is extended or adjusted under 35 U.S.C. 154(b) by 245 days.

(21) Appl. No.: 10/699,816

(22) Filed: Nov. 4, 2003

(65) Prior Publication Data

US 2004/0107998 A1    Jun. 10, 2004

(30) Foreign Application Priority Data

Dec. 4, 2002    (JP) ............................. 2002-352843

(51) Int. Cl.
*G05D 7/01*    (2006.01)
*F16K 17/30*   (2006.01)
(52) U.S. Cl. .................... 137/501; 137/454.5
(58) Field of Classification Search ................ 137/501, 137/503, 454.5; 251/282, 117
See application file for complete search history.

(56) References Cited

U.S. PATENT DOCUMENTS

| | | | | |
|---|---|---|---|---|
| 1,741,489 A | * | 12/1929 | Watts ........................ | 137/501 |
| 3,015,341 A | * | 1/1962 | Heland et al. .............. | 137/493 |
| 3,741,241 A | * | 6/1973 | Jackson ..................... | 137/504 |
| 4,724,866 A | * | 2/1988 | Bates et al. ................ | 137/498 |
| 5,474,105 A | * | 12/1995 | Able et al. ................. | 137/462 |

* cited by examiner

*Primary Examiner*—Stephen M. Hepperle
(74) *Attorney, Agent, or Firm*—Manabu Kanesaka

(57) ABSTRACT

In a flow control valve, a spool is fitted into a cylindrical body including an input port and an output port. A spring is disposed between the spool and a flow rate setting plug at an end of the cylindrical body. A flow bypass communicating with the input port and the output port is provided on an outer peripheral portion of the cylindrical body. When a quantity of a fluid flowing through the flow control valve is reduced, the fluid flowing through the flow bypass compensates the reduction thereof. Accordingly, it is possible to maintain a constant flow rate.

5 Claims, 6 Drawing Sheets

FLOW CONTROL VALVE

BACKGROUND OF THE INVENTION AND RELATED ART STATEMENT

The present invention relates to a flow control valve used for various industrial instruments, for example, a hydraulically control apparatus, such as a vehicle and a forklift.

Japanese Patent Publication (KOKAI) No. 5-204465 has disclosed conventional pressure compensation type flow control valves as shown in FIGS. 6 and 7. The flow control valve shown in FIG. 6 has a structure in which a spool 22 is slidably fitted in a cylindrical body 21, and a spring 24 is disposed between the spool 22 and a control screw portion 23 screwed to a base end of the body 21. When a fluid flows from an inflow port 26 to an outflow port 25 along an arrow in FIG. 6, the spool 22 performs a pressure-compensation operation for automatically controlling an opening of a throttle portion 22a formed between the spool 22 and the body 21. Accordingly, the fluid flows out of the outflow port 25 at a constant rate corresponding to an opening of a fixed orifice 27 disposed at the inflow port 26. In this case, the control screw portion 23 is rotated for adjusting a spring force of the spring 24 to control the flow rate.

The flow control valve as shown in FIG. 7 has a structure in which an inner cylinder 32 as a cylindrical portion is fitted in an outer cylinder 31. An annular space 34 is formed between the outer cylinder 31 and the inner cylinder 32 at a forward end side thereof from a screwing portion 33. Circular opening portions 31a, 32a are formed in peripheral walls of the outer cylinder 31 and the inner cylinder 32 for communicating inside portions of the outer cylinder 31 and the inner cylinder 32 with outside portions thereof, respectively. An inner periphery of the inner cylinder 32 is communicated with an outer periphery of the outer cylinder 31 through the opening portion 32a, the annular space 34 and the opening portion 31a. A cylindrical spool 35 is slidably fitted in the annular space 34.

The spool 35 has a circular opening portion 35b at a position adjacent to a land portion 35a. When the spool 35 is displaced in an axial direction, a throttle portion 36 formed between an opening portion 35b and the opening portion 31a of the outer cylinder 31 is changed from a fully closed state to a fully opened state. A spring 37 is provided between a right end side of the spool 35 and an inner end of the screwing portion 33 to thereby elastically contact them, so that the spool 35 is elastically urged toward the left end side by the spring 37.

A piston 38 operated externally is slidably fitted in the inner periphery of the inner cylinder 32. The piston 38 includes a screw portion 38a integrally, and is movably screwed into the inner cylinder 32 through the screw portion 38a to thereby form a variable orifice portion 40 between the opening portion 32a of the inner cylinder 32 and the piston 38.

When the fluid flows in through an inlet port 41a, the fluid flows into the annular space 34 through the orifice portion 40 from the inner periphery of the inner cylinder 32 along an arrow in FIG. 7 (hidden line). The fluid flows out to the outlet port 41b through the throttle portion 36 at a constant flow rate. In this case, the piston 38 is moved for changing an area of the opening portion 32a to control the flow rate.

In the conventional flow control valves with the structures described above, when the fluid (operating oil) flows into the flow control valve, a fluid force is applied to the spool. Therefore, there is a difference in pressures at a front side and a rear side of the flow control valve. When the fluid force becomes too large, the fluid flows into the flow control valve at a very low rate. As a result, it is difficult for the flow control valve to perform the pressure-compensation function.

In view of the above problems, the present invention has been made, and an object of the invention is to provide a flow control valve capable of maintaining a predetermined flow rate regardless of a difference in pressures at a front side and a rear side of the flow control valve.

Further objects and advantages of the invention will be apparent from the following description of the invention.

SUMMARY OF THE INVENTION

In order to attain the above objects, according to the present invention, a flow control valve includes a cylindrical body having a fluid input port or orifice and a fluid output port or orifice formed in a sidewall thereof; a spool fitted in the cylindrical body for compensating a pressure; a spring contacting the spool for applying a force in an axial direction; and a flow bypass connecting the fluid input orifice and the fluid output orifice. In the flow control valve of the present invention, it is possible to maintain a constant flow rate even when pressures at a front side and a rear side of the flow control valve are changed.

DETAILED DESCRIPTION OF PREFERRED EMBODIMENT

Figure 1:
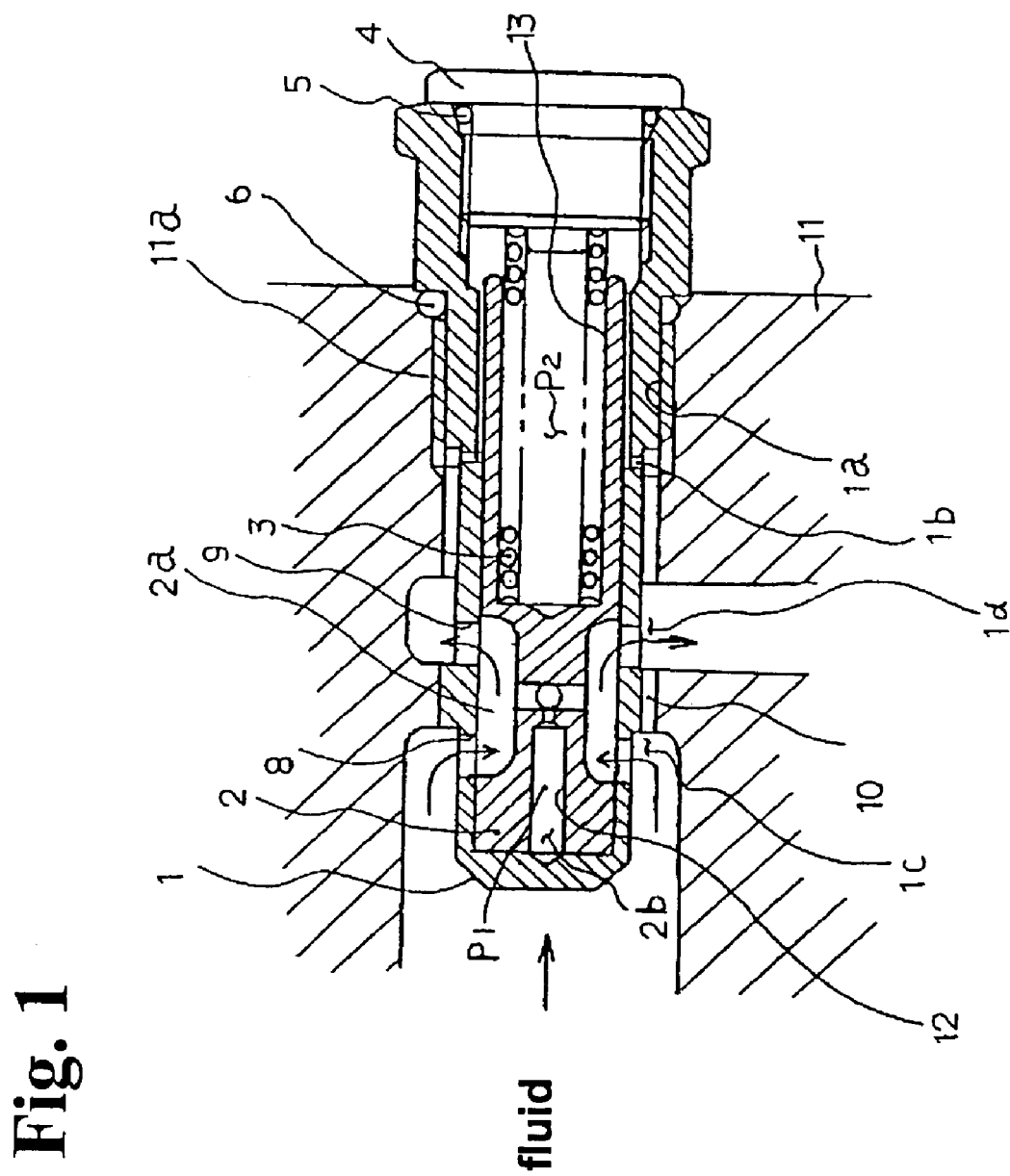
FIG. 1 is a vertical sectional view showing a structure of a flow control valve according to an embodiment of the invention.

Hereunder, embodiments of the present invention will be described with reference to the accompanying drawings. FIG. 1 is a vertical sectional view showing a structure of a flow control valve according to an embodiment of the present invention. The flow control valve is to be built in a chassis block 11 of a hydraulic power unit (not shown). A spool 2 is fitted into a cylindrical body 1 to be movable in an axial direction and a spring 3 is inserted in a cylindrical portion of the spool 2. One end of the spring 3 elastically contacts the cylindrical portion of the spool 2, and the other end thereof elastically contacts an inner end surface of a plug 4 screwed to a screw portion 1a of the body 1.

The body 1 includes the screw portion 1a to be screwed into a screw portion 11a formed in the chassis block 11; a pinhole 1b for filling a fluid into a large diameter portion 13 including the spring 3; an input port 1c formed of a plurality of orifices 8 arranged on a same circle for flowing the fluid supplied from a supply flow path in the chassis block 11 in an arrow direction into the spool 2; and an output port 1d formed of a plurality of orifices 9 arranged on a same circle for flowing out the fluid at a constant rate from the spool 2 to a flow path in the chassis block 11.

Figure 2:
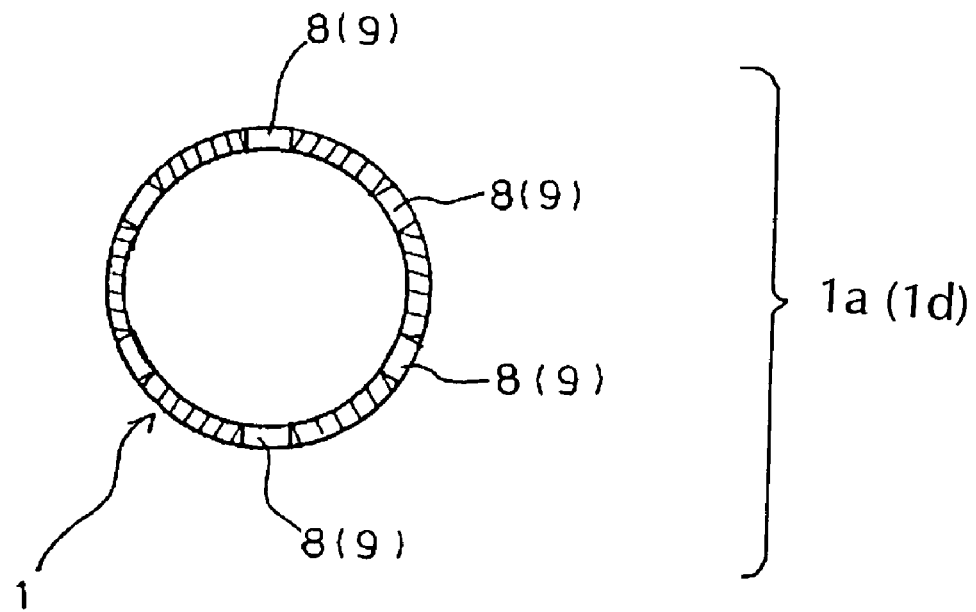
FIG. 2 is a sectional view of an input and an output port according to the embodiment.

FIG. 2 shows a sectional view including a surface cutting through centers of the orifices 8 constituting the input port 1c or centers of the orifices 9 constituting the output port 1d.

Figure 3:
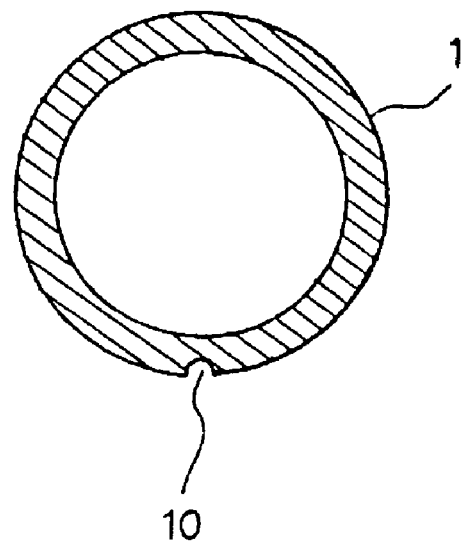
FIG. 3 is a sectional view of a flow bypass according to the embodiment.

A plurality of orifices 8 and orifices 9 is provided parallel to an axis of the body 1. As shown in FIG. 3, a flow bypass 10 is provided parallel to the body 1 between the supply flow path and the output port 1d. In order to prevent the fluid from leaking outside, an O-ring 6 is provided between the chassis block 11 and the body 1, and an O-ring 5 is provided between the plug 4 and the body 1, respectively.

An annular groove 2a and a pressure transmitting hole 2b that forms a small diameter portion 12 are provided in the spool 2, so that the fluid flowing from the input port 1c can be discharged through the output port 1d. The spool 2 moves forward or rearward in the axial direction to adjust a fluid opening portion formed of the input port 1c and the annular groove 2a from a fully closed state to a fully opened state.

Figure 4:
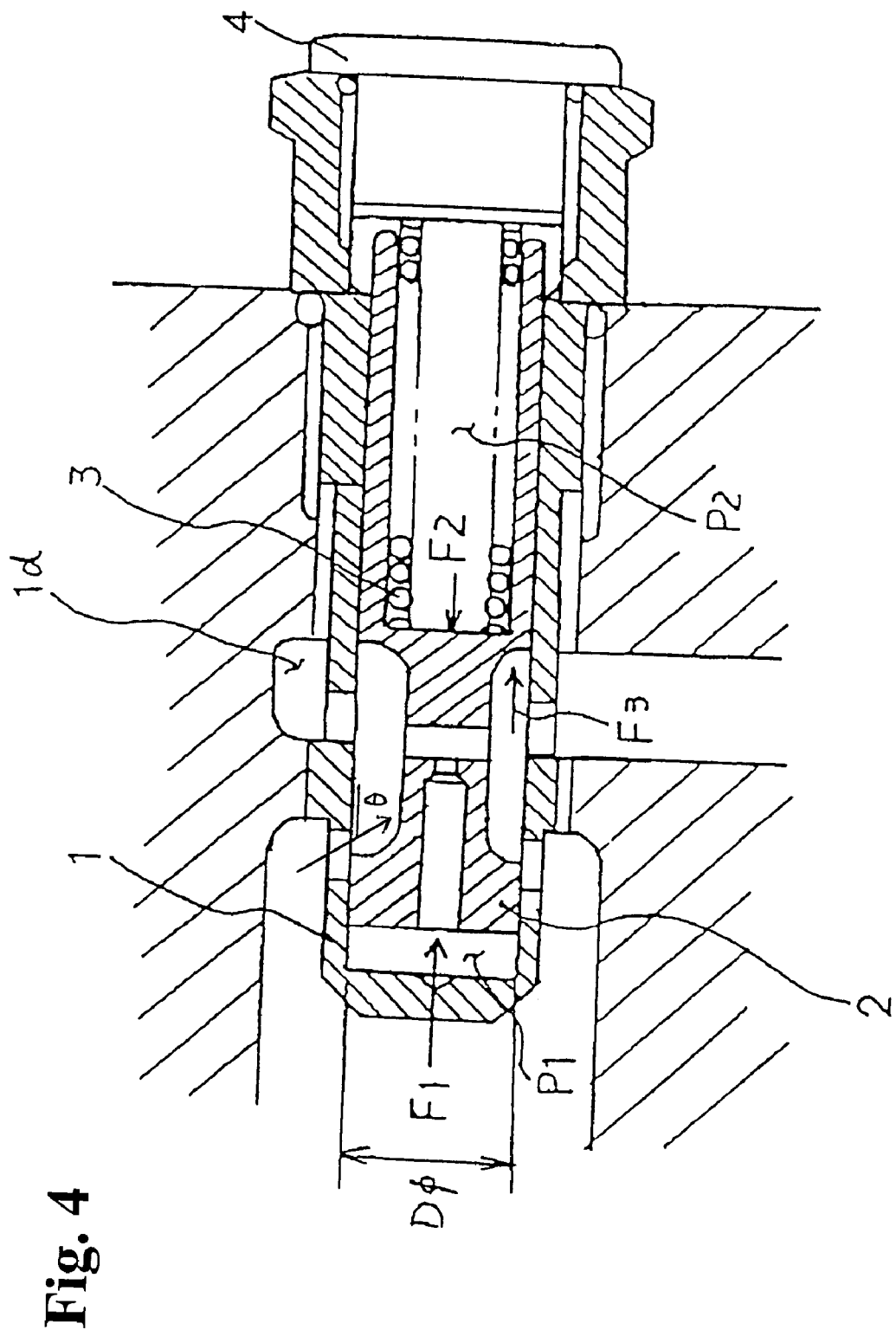
FIG. 4 is a sectional view showing an operating state of the flow control valve according to the embodiment.

In the flow control valve described above, when the fluid flows in through the input port 1c, the fluid flows out from the output port 1d through the annular groove 2a along an arrow shown in FIG. 1. In this state, a fluid pressure P1 is applied to a left end side of the spool 2 through the pressure transmitting hole 2b, and a fluid pressure P2 is applied to a right end side through the pinhole 1b. Accordingly, as shown in FIG. 4, a liquid pressure force F1 of $\pi D^2(P1-P2)/4$ is applied to the spool 2 as a driving force in the right direction, in which a left end (maximum) outer diameter of the spool 2 is D. A spring force F2 of the spring 3 is applied to the spool 2 as a driving force in the left direction, and a fluid force F3 (described later) generated at the annular groove 2a is applied to the spool 2 as a driving force in the right direction.

The fluid force F3 is expressed by the following equation:

$$F3 = \rho Q V \cdot \cos\theta \quad (1),$$

wherein $\rho$ is a density (kgf·sec$^2$/cm$^4$) of the fluid (operating oil); Q is a flow quantity (cm$^3$/sec); and V is a flow rate (cm/sec) at the throttle portion. Incidentally, the angle $\theta$ is an average angle of the fluid in a flow direction at the input port 1c.

In a range where the flow rate of the fluid is so low that the fluid force F3 is negligible, when the liquid pressure force F1 is less than the spring force F2, i.e. F1<F2, the spool 2 contacts a bottom surface of the cylindrical portion of the body 1. As a result, the flow rate increases with the fluid pressure. When the liquid pressure force F1 is larger than the spring force F2, i.e. F1>F2, the spool 2 moves in the body 1 in the right direction as shown in FIG. 4. The spool 2 stops at a position where the liquid pressure force F1 and the spring force F2 are balanced. As a result, the fluid is discharged at a constant flow rate through the output port 1d.

In the state that the liquid pressure force F1 and the spring force F2 are balanced, when the supply fluid pressure increases, the fluid pressure P1 increases to thereby move the spool 2 in the right direction. Accordingly, the opening of the orifice 8 is narrowed to reduce the fluid pressure P1. The spring force F2 is approximately constant, and the liquid pressure force F1 in proportion to (P1-P2) is controlled at a constant value. As a result, the fluid flows out from the output port 1d at a constant flow rate.

Figure 5:
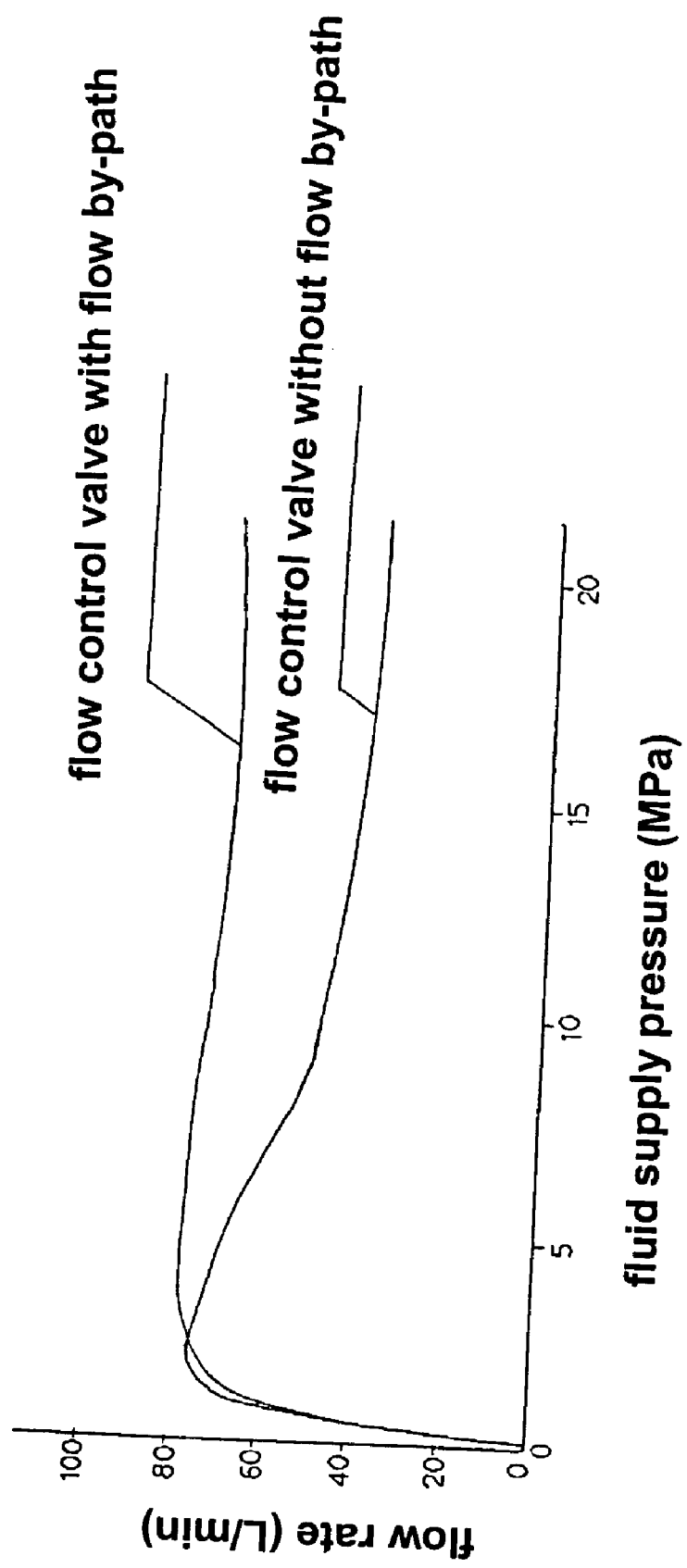
FIG. 5 is a graph showing flow control characteristics.
Figure 6:
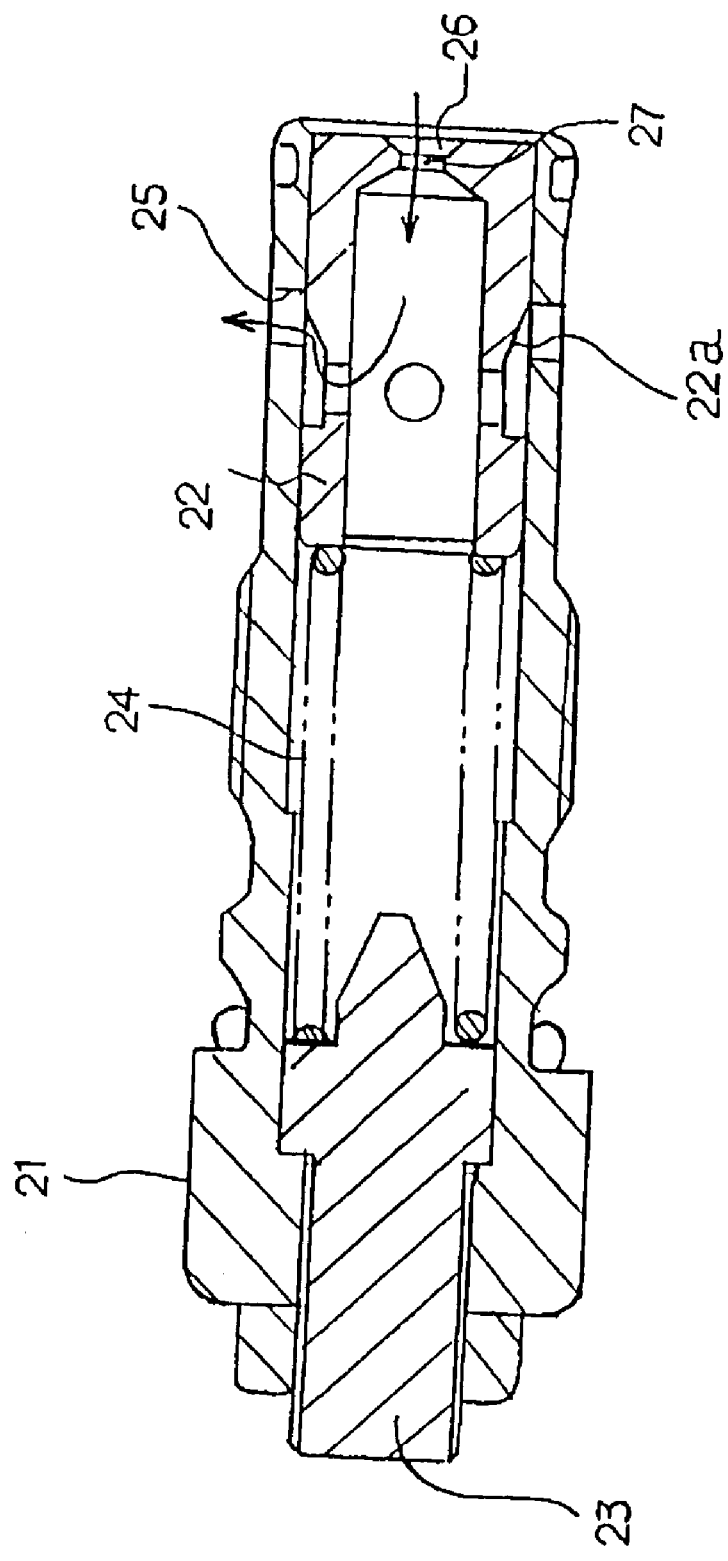
FIG. 6 is a vertical sectional view of a conventional flow control valve.
Figure 7:
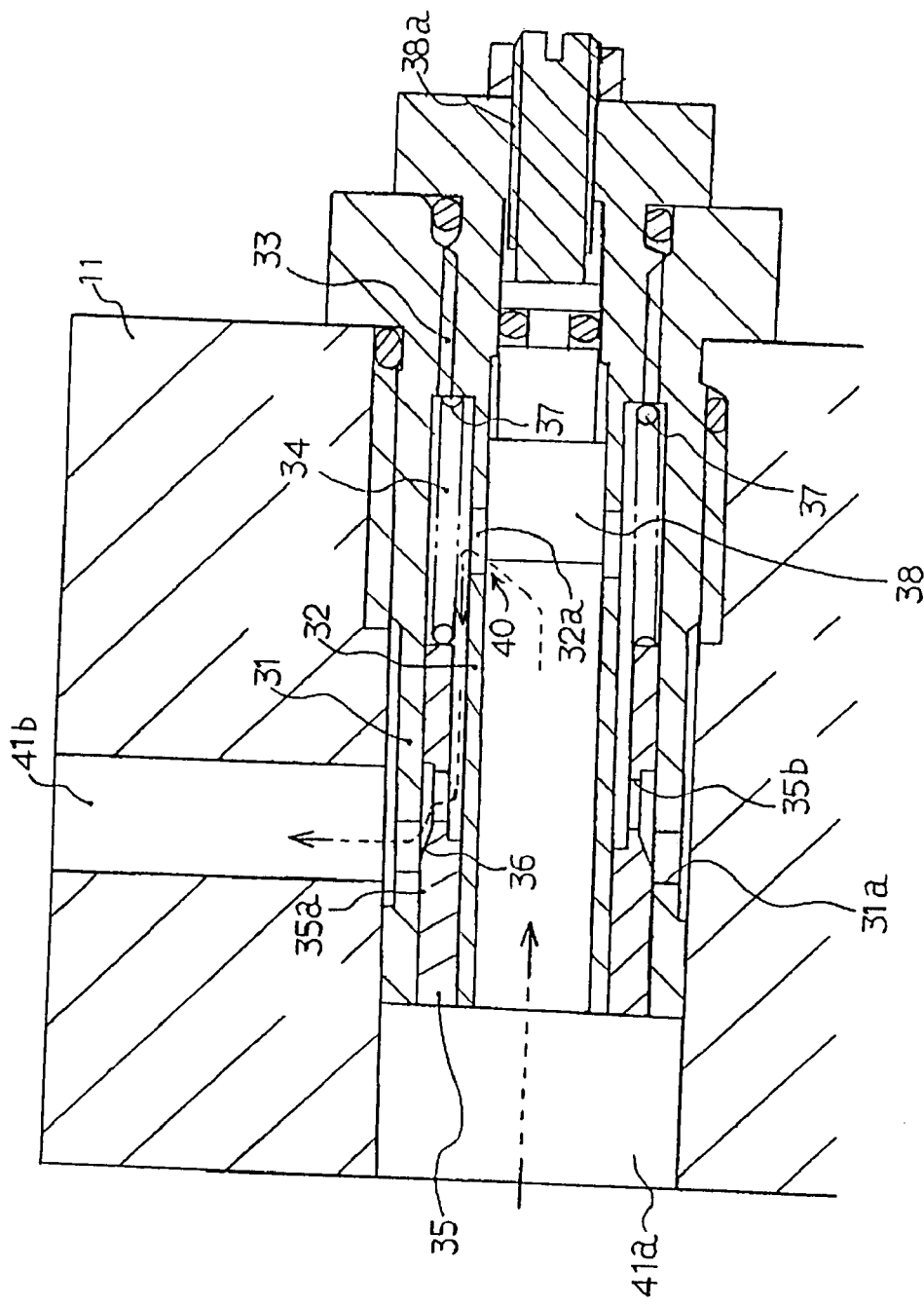
FIG. 7 is a vertical sectional view of another conventional flow control valve.

When the flow rate increases further, as shown in equation (1), the fluid force F3 increases in proportion to the current speed V to move the spool 2 in the right direction. Accordingly, the opening of the orifice 8 is narrowed to reduce a quantity of the fluid flowing out from the orifice 9. On the other hand, the flow rate from the fluid supply side to the output port 1d through the flow bypass 10 increases. A total quantity of the fluid relative to the fluid supply pressure is shown in FIG. 5.

In the flow control valve of the invention, the flow bypass 10 is provided as a fixed orifice at an outside of the flow control valve for connecting a front side and a rear side of the valve. When the flow rate is reduced with the fluid force F3 acting on the spool 2, the fluid flowing through the flow bypass 10 compensates the reduction. Therefore, it is possible to obtain the flow control valve with the excellent pressure compensation function. As shown in FIG. 5, when the flow control valve has no bypass flow path 10, the flow rate is remarkably reduced as the fluid pressure increases. In contrast, when the flow control valve has the bypass flow path 10, the flow rate is little changed with the fluid pressure.

The present invention is not limited to the embodiment described above, and various modifications can be made within the scope of the invention. For example, the shape, size and number of the orifices 8, 9, the flow by-path 10 and the like can be modified as necessity corresponding to the flow rate control range.

According to the present invention, the flow control valve has the structure described above to obtain the improved performance. Even when the flow control valve has a small size, therefore the fluid force has a larger influence on the function, it is possible to easily control the flow rate and obtain the excellent performance.

While the invention has been explained with reference to the specific embodiments of the invention, the explanation is illustrative and the invention is limited only by the appended claims.

What is claimed is:

1. A flow control valve comprising:
   a cylindrical body having an inner space, a fluid input port, and a fluid output port for allowing fluid to pass from the fluid input port to the fluid output port through the inner space,
   a spool fitted in the inner space of the cylindrical body to be movable along an axis thereof for changing an opening area of at least one of the fluid input port and the fluid output port,
   a spring disposed in the inner space of the cylindrical body for urging the spool in one direction along the axis, and
   a flow bypass for connecting the input port and the output port, wherein said flow bypass is a groove formed on an outer periphery surface of the cylindrical body.

2. A flow control valve according to claim 1, wherein said fluid input port and fluid output port are provided in a sidewall of the cylindrical body.

3. A flow control valve according to claim 2, wherein said fluid input port and fluid output port include a plurality of input orifices and a plurality of output orifices, respectively.

4. A flow control valve according to claim 2, wherein said spool includes a groove portion on a periphery surface thereof for connecting the fluid input port and the fluid output port, a small diameter portion formed at one side thereof and communicating with the groove portion, and a large diameter portion formed at the other side thereof and communicating with the fluid outside the fluid output port.

5. A flow control valve according to claim 4, further comprising a plug disposed at the other side of the cylindrical body so that the spring is situated between the plug and the spool, said plug being adjustable in the axial direction of the cylindrical body for adjusting an urging force of the spring.

* * * * *